US010212914B1

(12) United States Patent
Reynolds

(10) Patent No.: US 10,212,914 B1
(45) Date of Patent: Feb. 26, 2019

(54) CIRCULATION SYSTEM AND METHOD OF CIRCULATION

(71) Applicant: Aubrey W. Reynolds, Springdale, AR (US)

(72) Inventor: Aubrey W. Reynolds, Springdale, AR (US)

(*) Notice: Subject to any disclaimer, the term of this patent is extended or adjusted under 35 U.S.C. 154(b) by 24 days.

(21) Appl. No.: 15/065,359

(22) Filed: Mar. 9, 2016

(51) Int. Cl.
*A01K 1/00* (2006.01)
*F24F 13/22* (2006.01)
*F24F 13/28* (2006.01)
*F24F 13/30* (2006.01)
*F24F 12/00* (2006.01)
*F24F 7/08* (2006.01)
*F24F 13/32* (2006.01)
*B01D 46/00* (2006.01)
*B01D 46/42* (2006.01)
*F24F 7/00* (2006.01)

(52) U.S. Cl.
CPC ........ *A01K 1/0047* (2013.01); *B01D 46/0026* (2013.01); *B01D 46/4218* (2013.01); *F24F 7/08* (2013.01); *F24F 12/006* (2013.01); *F24F 13/222* (2013.01); *F24F 13/28* (2013.01); *F24F 13/30* (2013.01); *F24F 13/32* (2013.01); *F24F 2007/001* (2013.01)

(58) Field of Classification Search
CPC ............... A01K 1/0076; F24F 12/006; B01D 2258/0266; Y02B 30/563; Y02P 60/542; Y02P 60/54
USPC ............ 55/385.1, 385.2; 237/46, 50, 53, 55; 454/241, 244
See application file for complete search history.

(56) References Cited

U.S. PATENT DOCUMENTS

| | | | |
|---|---|---|---|
| 3,381,747 A | 5/1968 | Darm | 165/166 |
| 3,656,542 A | 4/1972 | Darm | 165/66 |
| 3,977,466 A | 8/1976 | Johansson | 165/40 |
| 4,043,256 A * | 8/1977 | Van Huis | A01K 1/0064 |
| | | | 119/448 |
| 4,134,545 A * | 1/1979 | Westbrook | F24D 5/04 |
| | | | 237/53 |
| 4,184,538 A | 1/1980 | Rauenhorst | 165/66 |
| 4,224,900 A * | 9/1980 | Truhan | A01K 31/18 |
| | | | 119/448 |
| 4,334,577 A * | 6/1982 | George | A01K 1/0076 |
| | | | 165/54 |
| 4,369,030 A | 1/1983 | Siccardi | 432/37 |
| 4,504,011 A | 3/1985 | Farrell | 237/14 |

(Continued)

FOREIGN PATENT DOCUMENTS

| | | | |
|---|---|---|---|
| DE | 102006038391 | 2/2008 | A01K 1/00 |
| WO | WO 9321758 | 11/1993 | A01K 1/01 |

*Primary Examiner* — Duane Smith
*Assistant Examiner* — Minh-Chau Pham
(74) *Attorney, Agent, or Firm* — Keisling & Pieper PLC; David B. Pieper

(57) ABSTRACT

Heat exchangers extract heat from an air stream and deliver the heat to another airstream. The heat exchangers are modified with a filtration system to allow the heat exchanger to effectively run within the poultry house environment. The poultry house is retrofitted with at least four flat-plate cross-flow heat exchangers. The heat exchangers operate to meet at least the minimum ventilation rates for the young birds. As birds grow, heat exchangers operate in conjunction with building exhaust fans for ventilation needs. Multiple heat exchangers are located throughout the house to provide appropriate ventilation.

4 Claims, 19 Drawing Sheets

(56) References Cited

U.S. PATENT DOCUMENTS

| | | | | |
|---|---|---|---|---|
| 4,843,786 | A | | 7/1989 | Walkinshaw et al. ........ 52/169.5 |
| 5,123,595 | A | | 6/1992 | Doss ................................ 237/46 |
| 5,492,082 | A | * | 2/1996 | Krevinghaus ......... A01K 1/0047 119/437 |
| 5,915,620 | A | * | 6/1999 | Doss .................... A01K 1/0076 237/46 |
| 6,014,948 | A | * | 1/2000 | Gordon .................... A01K 1/00 119/449 |
| 6,021,953 | A | * | 2/2000 | Swan ................... F24F 11/0001 236/44 A |
| 6,197,077 | B1 | * | 3/2001 | Simmons ............... B01D 46/10 55/351 |
| 6,321,687 | B1 | | 11/2001 | Lemmon et al. ............. 119/448 |
| 7,640,662 | B2 | | 1/2010 | Haglid ........................ 29/890.36 |
| 7,966,974 | B2 | | 6/2011 | Lorton et al. ................. 119/437 |
| 2006/0105696 | A1 | * | 5/2006 | Wenger ................... F24F 7/013 454/254 |
| 2007/0099555 | A1 | * | 5/2007 | Beauchamp ......... A01K 1/0064 454/238 |
| 2008/0139104 | A1 | * | 6/2008 | Lemke ................. A01K 1/0076 454/233 |
| 2011/0146582 | A1 | | 6/2011 | Lemmon et al. ............. 119/448 |

* cited by examiner

CIRCULATION SYSTEM AND METHOD OF CIRCULATION

CROSS-REFERENCE TO RELATED APPLICATIONS

This application claims priority to of U.S. patent application Ser. No. 13/331,198 filed by Aubrey W. Reynolds on Dec. 20, 2011 entitled Circulation System and Method of Circulation.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention is related to the heating and ventilation of a poultry house, such as broiler housing and chicken housing. Energy requirements for the supplemental heating of broiler housing are generally provided by gas heaters to maintain the necessary thermal environment to raise broilers. Supplemental heat is needed in the cold and mild season to maintain the building temperature. Energy consumption of poultry production is a major cash expense of producers.

Ventilation to remove moisture produced by the birds through respiration and fecal deposition results in unavoidable heat loss from the building. As producers increase their effort to better seal the houses, winter ventilation through exhaust fans contribute to a higher proportion of the heat loss in broiler houses.

The present invention is related to a heat exchanger modified for operation within a poultry house. Heat exchangers, also called heat recovery ventilators (HRV), extract (recover) heat from one air stream and deliver it to another airstream. By using a heat exchanger to recover some of the heat normally lost in exhaust ventilation air, fuel consumption may be reduced.

The heat exchanger must be modified to handle the additional dust, debris, and other particulates that exist within a poultry house. The heat exchanger must also handle the additional condensate present within a poultry house and the presence of ammonia vapors.

The present invention includes a strategic placement of at least one heat exchanger, preferably multiple heat exchangers, throughout the poultry house to properly ventilate the poultry house depending on the desired conditions. Multiple heat exchangers allow a user to provide individual control to each heat exchanger. The individual control of each heat exchanger enables simpler control of the exchangers without requiring a complex system to control the exchangers. Furthermore, multiple heat exchangers each using its own intake air outlet allows more consistent ventilation throughout the house as opposed to a single unit ventilating the entire house using a single duct with multiple outlets.

II. Description of the Known Art

Heaters, including gas heaters, such as natural gas heaters and propane heaters, electric heaters, and other heaters, generally provide the energy requirements for the supplemental heating of broiler housing. The heaters maintain the necessary thermal environment to raise broilers. Supplemental heat is needed in the cold and mild season to maintain the building temperature. Energy consumption of poultry production is a major cash expense of producers. Ventilation to remove moisture produced by the birds through respiration and fecal deposition results in unavoidable heat loss from the building. As producers increase their effort to better seal the houses, winter ventilation through exhaust fans will contribute to a higher proportion of the heat loss in broiler houses.

Patents and patent applications disclosing relevant information are disclosed below. These patents and patent applications are hereby expressly incorporated by reference in their entirety.

U.S. Pat. No. 4,369,030 issued to Siccardi on Jan. 18, 1983 ("the '030 patent) teaches a heating-ventilating system including an air duct adapted to be installed in an exterior wall of a poultry house and having a fan mounted near the interior end of the duct and a fuel burner mounted in the duct upstream from said fan, the fuel burner being adapted to burn fuel efficiently in the high velocity air flow provided by the fan; an automatic damper upstream of the burner controlled by the pressure differential across the burner; an igniter including an electric spark generator and a starter-maintainer jet forward thereof for igniting the burner in response to an electrical signal; a controller for the fan which operates the fan alone in response to a warmer than desired temperature in the poultry house, which causes the fan to turn off at a desired temperature range in the poultry house, and which causes the fan to operate in conjunction with the fuel burner for lower than desired temperatures; and a curtain opening controller for automatic adjustment of curtains responsive to the fan burner controller.

U.S. Pat. No. 4,504,011 issued to Farrell on Mar. 12, 1985 ("the '011 patent") teaches an air conditioning system for a poultry house. Plenum structure taught by the '011 patent extends substantially the entire length of the poultry house. A forced-air heating unit taught by the '011 patent is coupled to the plenum structure by flexible conduit. The heated air taught by the '011 patent is controlled by slidable adjustment structure to provide substantially even heat along the entire length of the plenum structure.

U.S. Pat. No. 5,123,595 issued to Doss on Jun. 23, 1992 (the '595 patent") is directed to a method and apparatus for growing poultry or other domesticated fowl in an indoor environment. In particular, the '595 patent is directed to an apparatus for heating and ventilating a poultry house and a method for using the same. Central to the apparatus and method taught by the '595 patent is an energy exchange unit which uses the thermal energy of the exhaust air drawn from the poultry house to pre-heat the incoming fresh air supplied to the poultry house.

U.S. Pat. No. 7,640,662 issued to Haglid on Jan. 5, 2010 ("the '662 patent") teaches a heat exchanger that is made economically by pressure-forming cavities in relatively thick thermo-plastic panels, interleaving them with other thermo-plastic panels having separate gas flow conduit structures, and securing the panes together. Preferably, the heat exchanger taught by the '662 patent is an opposed-flow-heat-exchanger giving improved heat-transfer efficiency.

U.S. Pat. No. 7,966,974 issued to Lorton, et al. on Jun. 28, 2011 ("the '974 patent") teaches an apparatus and method for raising poultry, such as chickens, for food production. The '974 patent teaches that it will be appreciated that typically a plurality of heaters greater than two will be included in the facility 12 to sufficiently warm the interior of the facility at various times. A plurality of temperature sensors in the form of thermistors 92a-92f taught by the '974 patent are also suspended to preferably within about eighteen inches from the floor 86. An optional pair of temperature sensors 93a and 93b in the form of thermistors taught by the '974 patent may also be suspended or otherwise mounted exteriorly of the facility 12, such as from a portion of the roof 22 or on one or more of the walls 14-20.

SUMMARY OF THE INVENTION

Heat exchangers, also called heat recovery ventilators (HRV), extract heat from an air stream and deliver the heat to another airstream. The present invention retrofits a broiler house with at least four flat-plate cross-flow heat exchangers. In one embodiment, the heat exchangers may be placed in the half-house brood chamber. The heat exchangers operate to meet at least the minimum ventilation rates for the young birds. As birds grow, heat exchangers operate in conjunction with building exhaust fans for ventilation needs.

Intake air was pre-heated up to 25° C., partially as a result of large amounts of condensation formed due to large amounts of latent heat in the warm air stream. The amount of energy recovered was calculated based on an energy balance across the heat exchangers on the cold air side. The estimated heat recovered was equivalent to 593 and 253 gallon of propane for two test periods during the winter flock and mild season flock, respectively. Electricity consumption from both the wall exhaust fans and the heat recovery ventilators were 1,218 and 728 kWh higher than those of the control house during the two test flocks.

present invention reduces the energy requirements of heating a poultry house.

The present invention improves ventilation of a poultry house.

The present invention reduces costs required to operate a poultry house.

The present invention provides a rugged heat exchanger that operates properly within a poultry house.

It is an object of the present invention to properly handle dust, debris, other particulates and ammonia vapors.

It is another object of the present invention to remove condensate within the poultry house.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

The present invention utilizes heat exchangers placed throughout the poultry house. The heat exchangers of the present invention are modified to enable usage of the heat exchangers within the poultry house environment.

Figure 1:
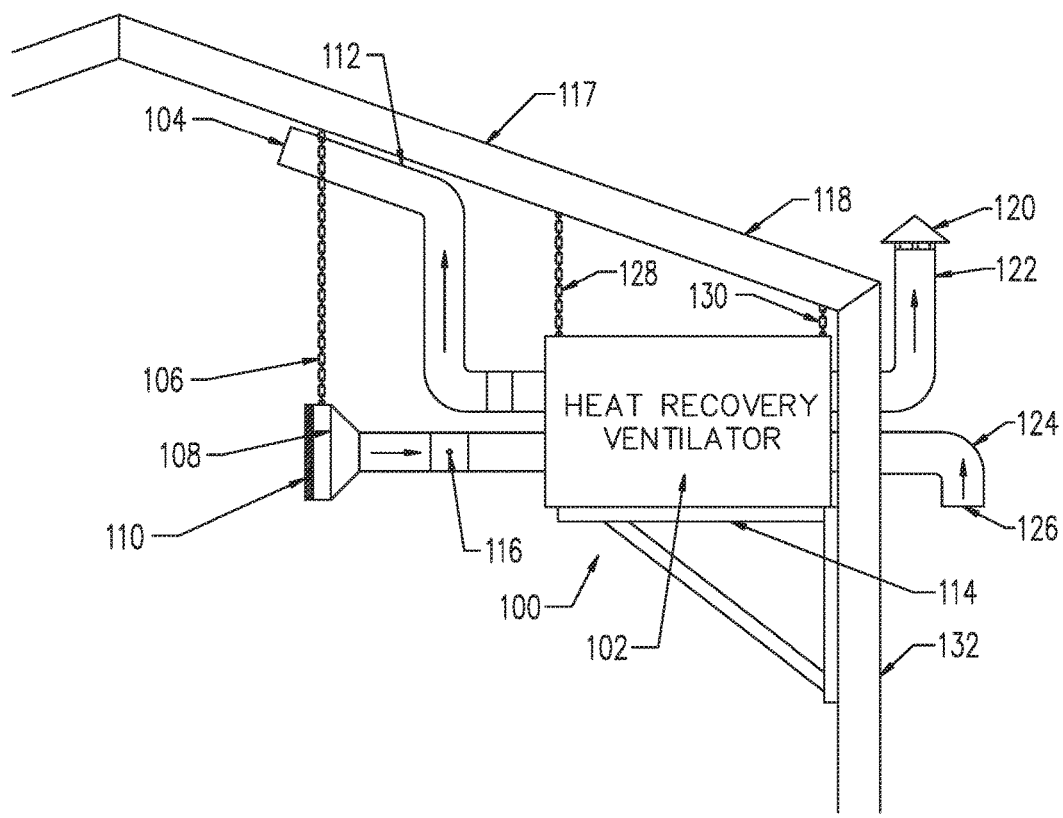
FIG. 1 is an environmental view showing one embodiment of the present invention.
Figure 2:
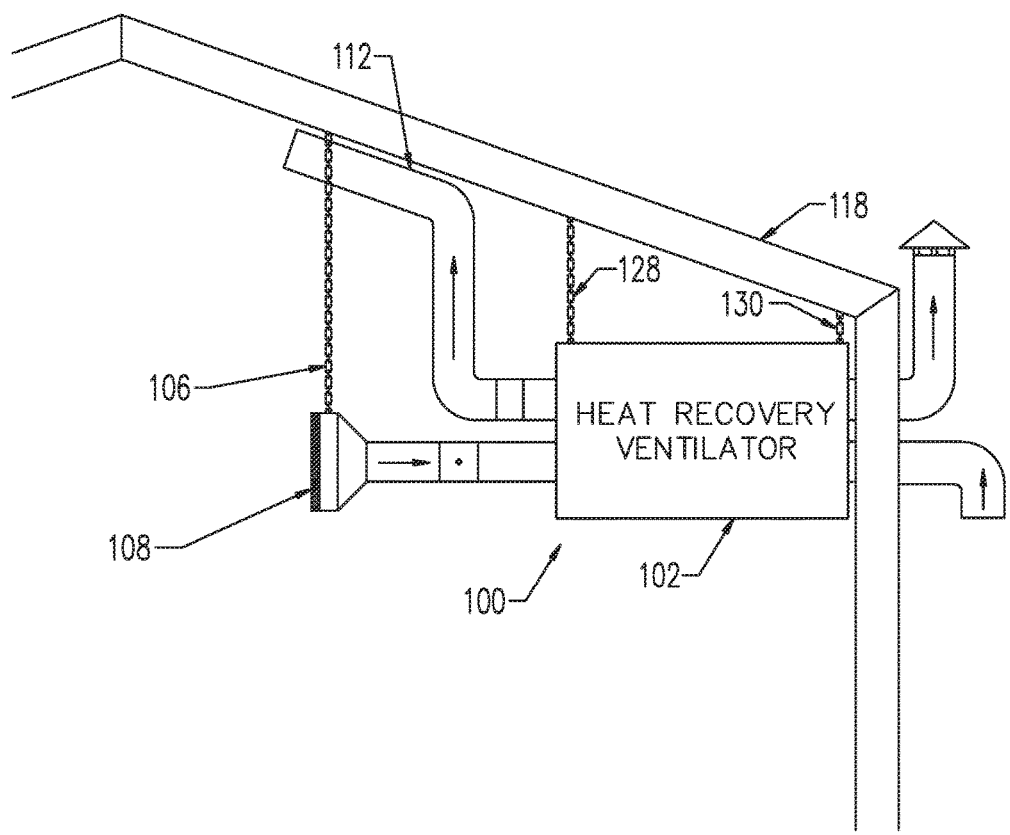
FIG. 2 is an environmental view showing one embodiment of the present invention.
Figure 3:
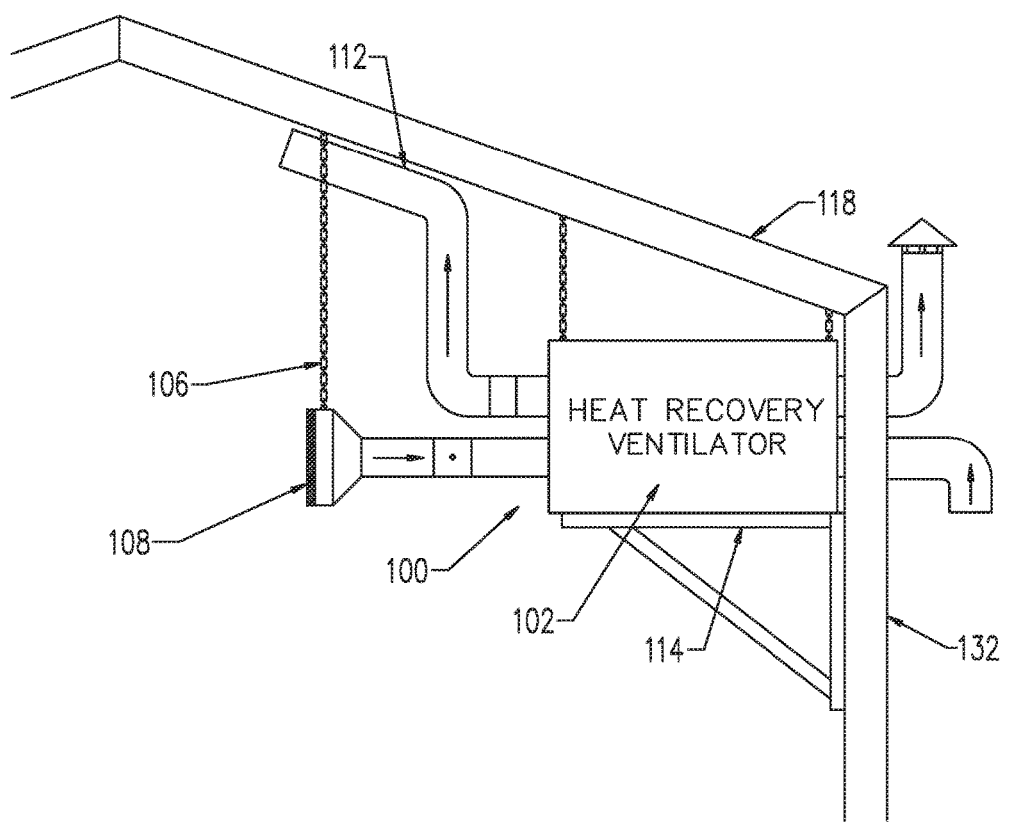
FIG. 3 is an environmental view showing one embodiment of the present invention.
Figure 6:
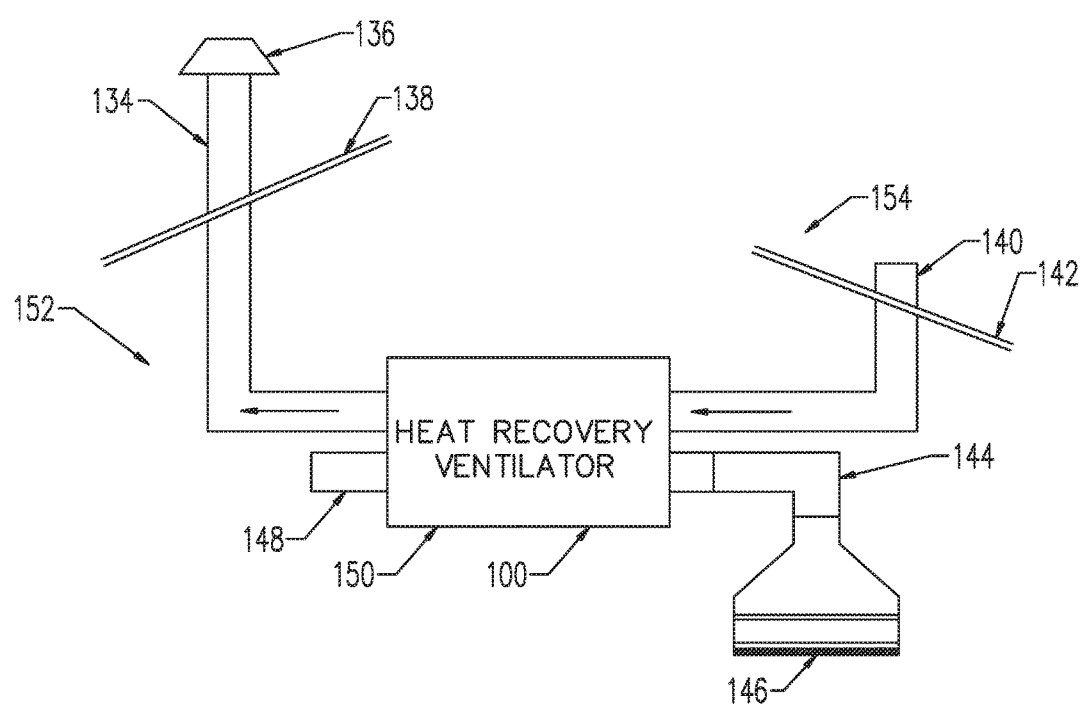
FIG. 6 is an environmental view showing one embodiment of the present invention.

Referring to FIG. 1, the heat exchanger configuration of the present invention is generally shown as 100. The heat exchanger 102 is mounted towards the side of the house 117. The heat exchanger may be installed in other locations of the house 117, such as the center of the house. The dimensions of a poultry house may vary according to a farmer's needs. In one embodiment, the heat exchanger units are located along the side walls as shown in FIGS. 1-3. If the height of the house is not adequate size, the heat exchangers may be located along the centerline of the house or otherwise away from the side walls as shown in FIG. 6.

By locating the heat exchangers along the side walls of the house, the farmer can reduce the duct length and the amount of duct work required. If the heat exchangers are located along the centerline of the house, the heat exchanger can use ventilation air from the attic space to reduce duct length. The temperature of ventilation air pulled from the attic space was higher than ambient temperature partially due to heat losses through the ceiling. Greater savings result from having more units and locating the units on the side walls because the energy balance has a greater ΔT utilizing air directly from the outside.

The heat exchanger 102 extracts heat front one air stream and delivers the heat to another air stream. As shown in FIG. 1, heat exchanger 102 draws intake air from outside through intake air inlet 124 and releases the intake air within the house through intake air outlet 104. Heat exchanger 102 also draws house air through house air inlet 108 to be released outside through house air outlet 122. Heat from the house air is transferred to the intake air at heat exchanger 102. The transfer of heat warms the intake air before circulating the intake air into the house. Recovering the heat from the house air reduces the costs required to heat the house.

Heat exchanger 102 draws intake air into the house through intake air inlet 124. Screen 126 filters the intake air to prevent animals, insects, and other unwanted materials from entering the intake air inlet 124. Screen 126 also prevents animals, such as birds and mice from nesting within intake air inlet 124. The intake air is then transferred into the heat exchanger 102. At heat exchanger 102, the heat from house air is transferred to the intake air. The intake air is then supplied to the house 117 through intake air outlet 104.

To ventilate the house 117, heat exchanger 102 draws house air from the house 117 to be released outside of the house. The house air is drawn into heat exchanger 102 through house air inlet 108. Filter 110 filters the dust, debris, and other particulates from the house air prior to the house air entering the heat exchanger 102. The filter 110 will be discussed in greater detail below. The heat exchanger 102 exchanges the heat of the house air with the intake air at heat exchanger 102. The house air is then transferred from the house 117 through house air outlet 122. Cap 120 prevents rain, animals, other living animals, and other environmental factors from entering the house air outlet 122. House air outlet 122 directs the house air away from the intake air inlet 124 to prevent intake air inlet 124 from drawing the house air back into the house 117. This transfer of air to and from the house ventilates the house.

In one embodiment, the present invention uses ducts for transfer of the air. As shown in FIG. 1, duct 112 delivers the intake air within the house 117. The amount of ductwork depends on the positioning of the heat exchanger 102 within the house 117. FIGS. 1-3 show different embodiments in which the heat exchanger 102 is located at the side of the house 117.

FIG. 6 shows another embodiment in which the heat exchanger 150 is located more internally within the house 117. The more internally located heat exchanger 150 requires additional ductwork for delivering and drawing the air. The heat exchanger 150 may need to be located more centrally within the house 117 due to the height of the house 117. In one embodiment, the heat exchanger would be located on the sides of the house. Because the dimensions of poultry houses and other houses vary, the height of the wall at the side of the house may not be tall enough for placement of the heat exchanger at the side. If the wall is not high enough at the sides of the house, the heat exchanger may be installed away from the sides, such as at the center, of the house because of the increased height towards the center of the house.

Referring to FIG. 1, the heat exchanger is mounted on side wall 132 of house 117. FIG. 1 shows two support structures for the heat exchanger. The heat exchanger 102 may be placed on the support body 114. Support body 114 mounts onto the wall for placement of the heat exchanger 102.

Heat exchanger 102 may also be hung from the ceiling of the house 117. Hanging supports 128, 130 such as chains, webbing, and other materials that can support the heat exchanger 102, attach to the heat exchanger 102 to support the heat exchanger 102. Hanging supports 128, 130 provide additional support to the heat exchanger 102 shown in FIG. 1. Hanging support 106 supports the house air inlet 108.

FIG. 2 shows a second embodiment in which the heat exchanger 102 is supported by hanging supports 128, 130. Hanging supports 128, 130 suspend the heat exchanger 102 from the ceiling of the house 117. Suspending heat exchanger 102 and house air inlet 108 from the house allows a person to easily move the house air inlet 108 and associated duct 102 and inlet 108 to perform work on the floor of the house. The user can then clean or perform other tasks or jobs without inlet 108 in the way of cleaning or performing other tasks.

FIG. 3 shows another embodiment in which the heat exchanger 102 is placed on the support body 114. Support body 114 elevates the heat exchanger 102 off the floor to prevent debris and other particulates from entering the heat exchanger. The user can also perform work and other tasks underneath the support body 114.

Figure 4:
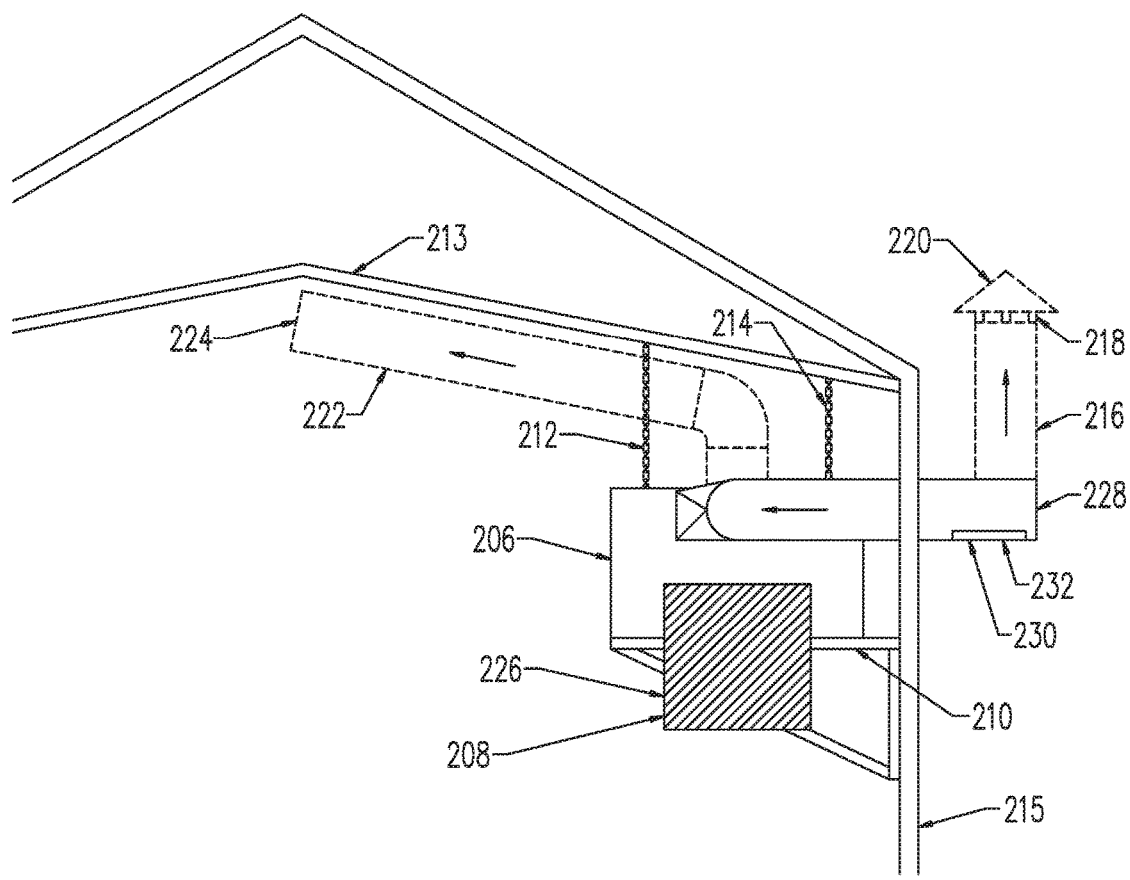
FIG. 4 is an environmental view showing one embodiment of the present invention.
Figure 5:
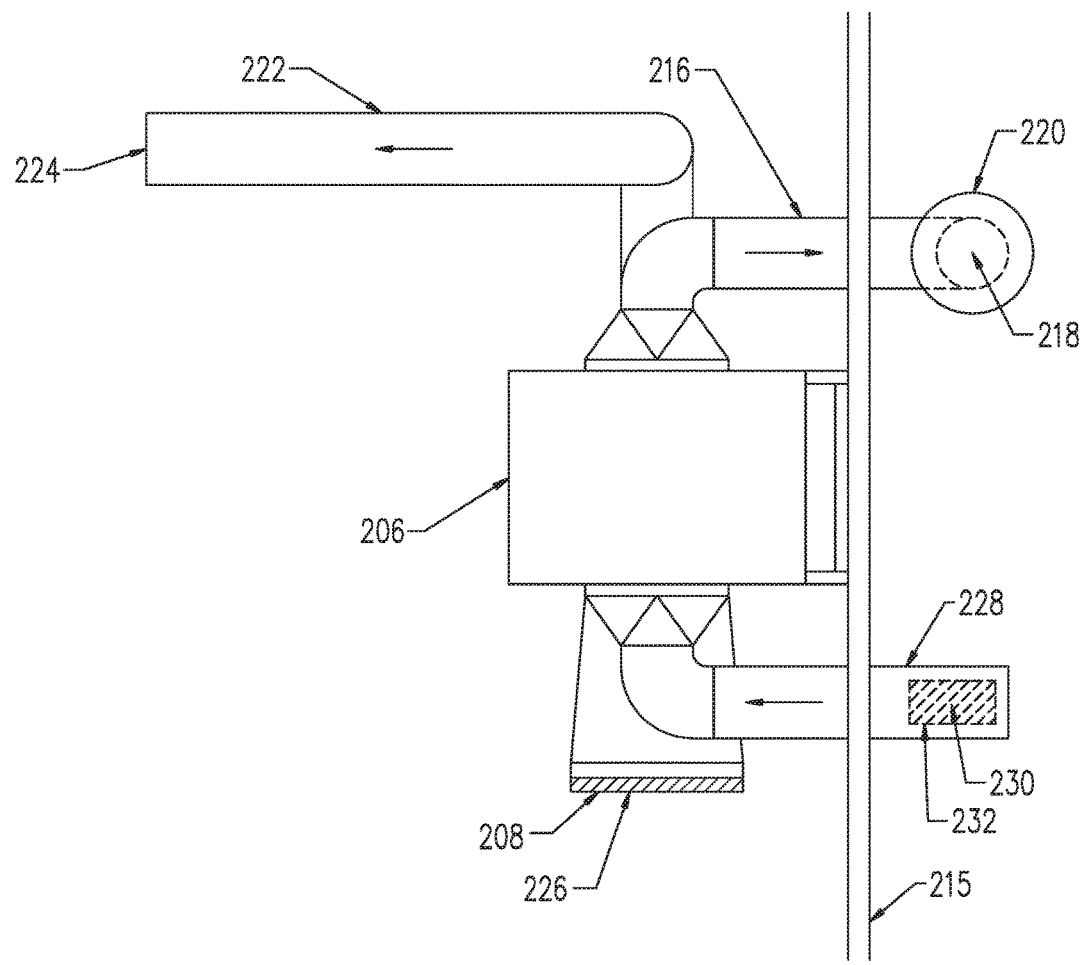
FIG. 5 is another environmental view thereof.

FIGS. 4 and 5 show one embodiment of the present invention in which the heat exchanger 206 is installed adjacent side wall 215. As described above, support body 210 and hanging supports 212, 214 elevate the heat exchanger off the floor of the house. The embodiment shown in FIGS. 4 and 5 provide intake air inlet 230 and intake air outlet 224. As described above, intake air inlet 230 and duct 228 draw fresh air from outside the house to heat exchanger 206. Screen 232 limits animals, debris, and other potential contaminants from entering intake air inlet 230

House air inlet 208 draws air from the house to the heat exchanger 206. The house air is released outside of the house at house air outlet 218. Filter 226 limits the number of contaminants and other debris that can enter the house air inlet 208 and heat exchanger 206.

At the heat exchanger 206, the heat from the house air is transferred to the fresh air to raise the temperature of the fresh air. The fresh air and the house air are maintained separately to prevent the two from mixing. The heat exchanger 206 releases the fresh air through duct 222 and intake air outlet 224. In one embodiment, intake air outlet 224 releases the fresh air near the ceiling 213.

The heat exchanger releases the house air through duct 216 and house air outlet 218. Cap 220 limits rain, debris, environmental elements, and other contaminants from entering house air outlet 218, duct 216, and heat exchanger 206.

FIG. 5 shows a top down view of one embodiment of the system. House air outlet 218 and intake air inlet 230 are separated. Heat exchanger 206 draws fresh air upwards into intake air inlet 230 as shown in FIGS. 4 and 5. Heat exchanger 206 also releases house air upwards through house air outlet 218. The separation of fresh air inlet 230 and house air outlet 218 limits the amount of house air that is drawn back into the house through intake air inlet 230.

Figure 7:
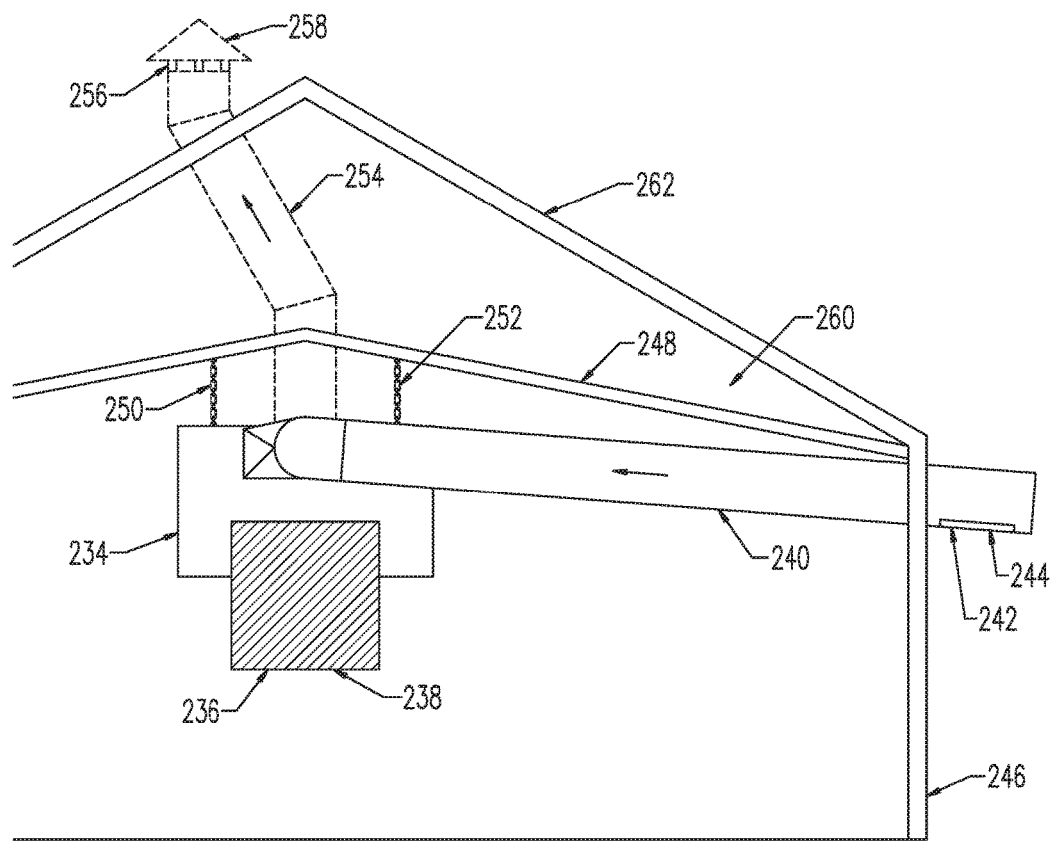
FIG. 7 is an environmental view showing one embodiment of the present invention.
Figure 8:
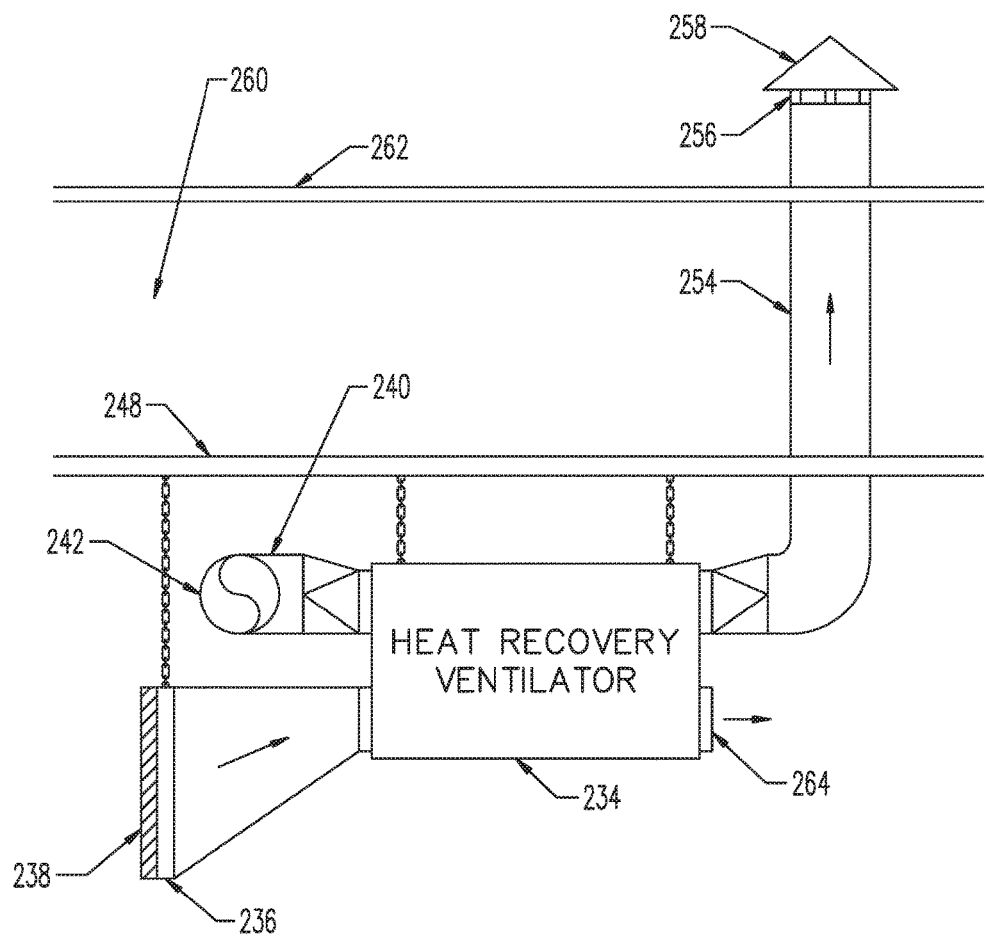
FIG. 8 is another environmental view thereof.

FIG. 6 shows another embodiment in which the heat exchanger 150 is placed more centrally within the house 152. Because the types of houses may vary, the heat exchanger 150 may be installed according to the needs of the user. FIG. 6 shows an embodiment in which the intake air is drawn into intake air inlet 140. In this embodiment, intake air inlet 140 is positioned within attic space 154 of the house 152, between ceiling 142 and roof 138. In another embodiment, the intake air inlet 140 may be positioned outside above the roof 130. A cap may be installed above the intake air inlet 140 to prevent rain, animals, and other environmental factors from entering the intake air inlet. A user may also run ductwork to the side of the house for drawing air from the side of the house as shown in FIGS. 7-8. The intake air flows to the heat exchanger 150 where heat from the house air is transferred to the intake air. The intake air is then supplied within the house 152 through intake air outlet 148.

The heat exchanger 150 draws the house air to the heat exchanger 150 through house air inlet 144. Before entering the house air inlet 144 and the heat exchanger 150, the house air is filtered through filter 146 to remove the dust, debris, and other particulates from the house air. Heat from the house air is transferred to the intake air at heat exchanger 150. The house air is then transported outside of the house through house air outlet 134. Cap 136 prevents rain, animals, other living animals, and other environmental factors from entering the house air outlet 134. In this embodiment, house air outlet 134 transfers the house air through the ceiling 142 and roof 138. In other embodiments, the user may install ductwork to transfer the air through the sides of the house as shown in FIGS. 1-3.

FIGS. 7 and 8 show another embodiment of the present invention in which the heat exchanger is located away from the side 246. Hanging supports 250, 252 suspend the heat exchanger 234 from ceiling 248. In this embodiment, heat exchanger 234 draws fresh air from outside through intake air inlet 242 and duct 240.

The heat exchanger 234 draws the house air through house air inlet 236 and filter 238. The heat exchanger 234 transfers the heat from the house air to the intake air (fresh air) at heat exchanger 234. The heat exchanger then releases the heated intake air into the house and releases the house air outside of the house.

The fresh air is released through the intake air outlet 264. Because of the placement of the heat exchanger 234 throughout the house, ductwork may not be required in such an embodiment. The heat exchangers may be located where the fresh air should be released to reduce he amount of ductwork needed to transfer the fresh air from the heat exchanger 234 to the house.

Heat exchanger 234 releases the house air out the house air outlet 256 through the ceiling 248, attic 260, and roof 262. As described above, filter 238, cap 258 and screen 244 limit contaminants and other debris from entering the heat exchanger 234.

Figure 9:
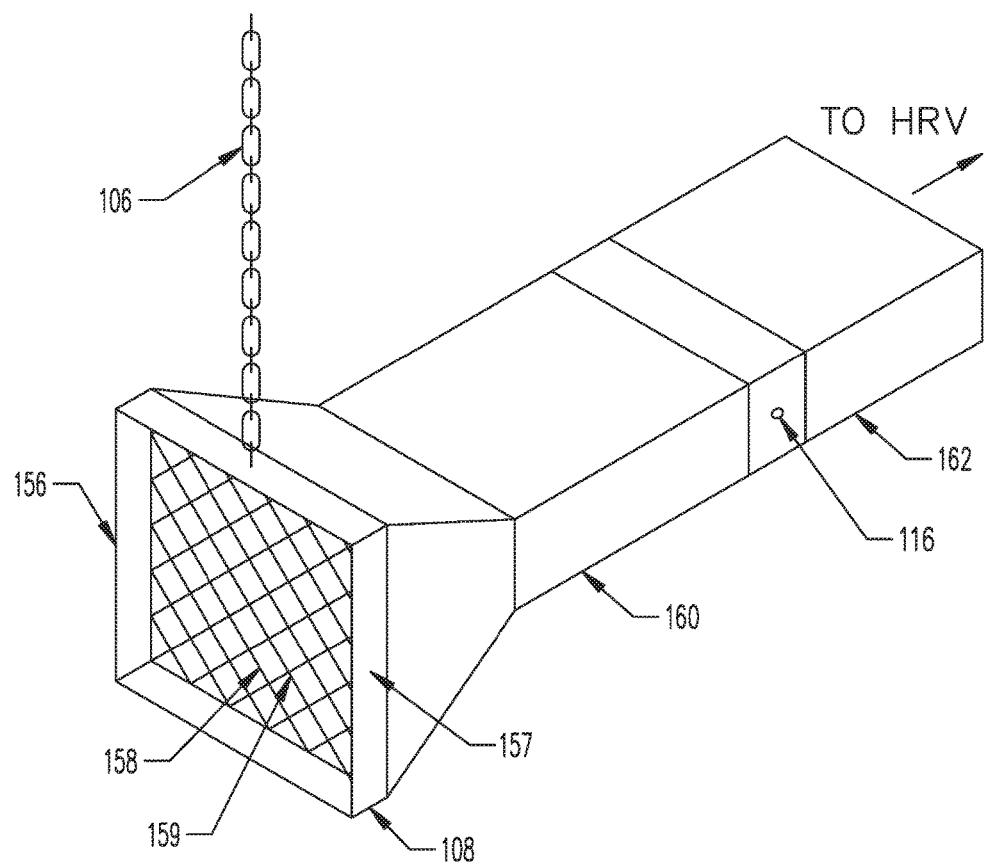
FIG. 9 is an environmental view showing a filter assembly of one embodiment of the present invention.

FIG. 9 shows one embodiment of the filter assembly of the present invention. Known heat exchangers cannot handle the dust, debris, and other contaminants found within a poultry house. The present invention modifies the heat exchanger to provide a more robust heat exchanger that can function in the poultry house. The heat exchanger is designed to handle the high level of dust encountered in a poultry house. Adequate filtration is needed to maintain the efficiency of the heat exchanger. Without adequate filtration, the heat exchanger will not function properly or efficiently. Known filters do not provide adequate filtration for the heat exchanger to function properly. The heat exchanger of one embodiment utilizes a polypropylene core to prevent degradation by ammonia vapors. Other embodiments may include heat exchangers that utilize known cores.

One embodiment of a heat exchanger uses plates for transfer of heat from the house air to the intake air. The fluid, such as the intake air and house air, flows between the plates. The spaces between the plates become clogged if the house air is not adequately filtered thus reducing efficiency of the heat exchanger. Available HVAC filters require a large number of filter changes to keep dust out of the heat exchangers.

To avoid the problems caused by available HVAC filters, an improved filtration system was developed for use within the heat exchanger. The filter system includes a 144-cm by 144 cm filter housing 156. A 5-cm (approximately 2 inches) thick polyester filter is then placed within the filter tray. The filtration system is less expensive than the available HVAC filters.

Furthermore, the filtration system requires fewer replacements of the filter as the filter functions properly for at least two days prior to being changed. Fewer replacements of the filtration system require less labor and fewer filters.

The filters of one embodiment are polystyrene mesh designed to trap particulate and allow the very fine particles to pass through the exchanger core without interfering with heat transfer. The filter folder does not require a cover to hold the filter place. The filter material provides a tight fit that holds the filter in place. A new filter can easily be removed and a new filter installed with minimal labor.

The filter is placed in the filter housing 156 to secure the filter against the filter screen 158. Filter lip 157 extends outward from the house air inlet 108 to define a filter installation area 159. The filter is placed within the filter installation area 159 defined by the filter lip 157. The filter screen 158 located adjacent the filter installation area 159 prevents the filter from passing into house inlet 108. Duct 160 attaches to duct 162 leading to the heat exchanger by fastener 116. Fastener 116 provides simple connect and disconnect of ducts 160, 162 to enable the user to quickly disconnect house inlet 108 from the heat exchanger. The hanging support 106 supports the house inlet 108 to allow the user to move house inlet 108 to provide a user access to that area.

Figure 10:
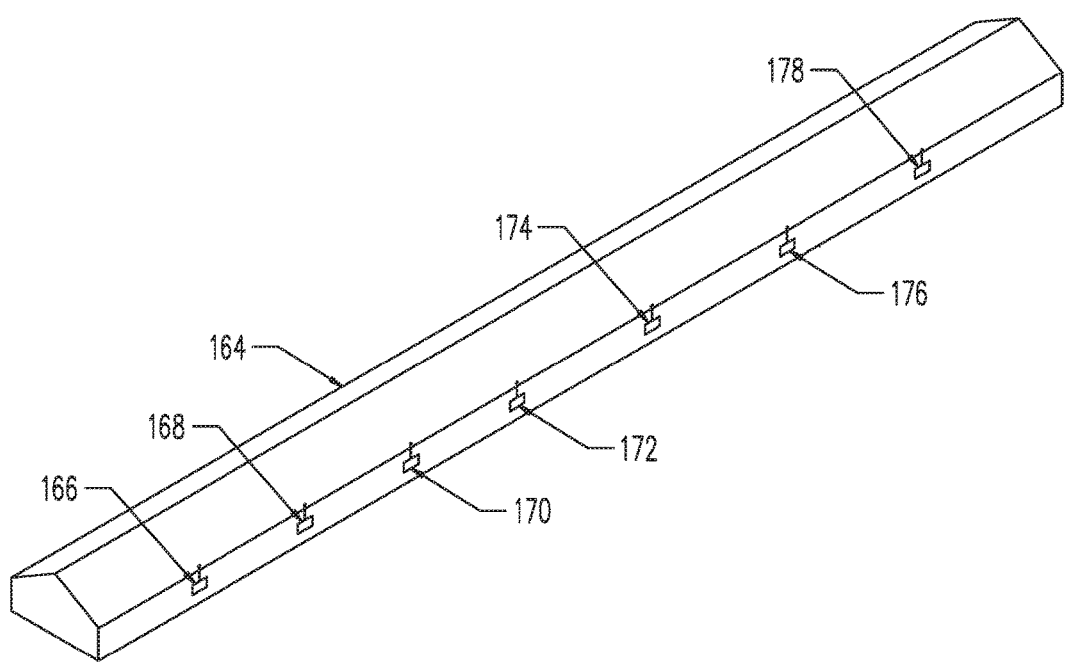
FIG. 10 is an environmental view of one embodiment of the present invention.

FIG. 10 shows one installation of multiple heat exchangers 166, 168, 170, 172, 174, 176, 178 within house 164. Multiple heat exchangers are recommended for the ventilation instead of one large heat exchanger. The use of one heat exchanger requires running ductwork for ventilating the entire house. Furthermore, the use of one heat exchanger requires more complex controls to properly ventilate the entire house. The use of multiple heat exchangers does not require the amount of ductwork or controls required for a single unit.

The user must decide the number of heat exchangers to use in the house. The user provides at least a minimum ventilation rate based upon the number of animals within the house. In one embodiment, the return on investment is quicker by using the heat exchangers during the early growing season of the flock. The use of the heat exchangers during the early portion of the growing season provides more effective transfer of heat from the house air to the intake air. Throughout the growing period, the birds increase in size such that the birds generate additional heat within the house. The added heat from the birds provides additional warmth to the house.

The heat exchangers provide a greater impact at the beginning of the growing cycle. The user must determine the ventilation rate required for the number of birds within the house. The user will determine the ventilation rate for the house for the period of time for which the heat exchangers will provide the ventilation.

For example, a user may require that the house has a ventilation rate of seventy five cubic feet per minute per one thousand birds (75 cfm/1000 birds) during week 1. The user may also require a ventilation rate of one hundred fifty cubic feet per minute per one thousand birds (150 cfm/1000 birds) during week 2. The user may also require a ventilation rate of three hundred cubic feet per minute per one thousand birds (300 cfm/1000 birds) during week 3. The user will then determine the maximum required ventilation rate for which the user will provide via the heat exchangers. In this example, the maximum required ventilation rate is three hundred cubic feet per minute per one thousand birds (300 cfm/1000 birds).

The total ventilation is calculated by the formula:

$$\text{Max Required Ventilation Rate} * \text{\# of Birds} = \text{Total Ventilation}$$

If the user was raising twenty thousand (20,000) birds, the user would calculate that the house required total ventilation of six thousand (6,000) cfm. The required number of heat exchangers is determined by the rating of the heat exchangers. The user can use one heat exchanger or multiple heat exchangers. The number of heat exchangers is calculated according to the following formula:

$$\text{Total Required Ventilation}/\text{Heat Exchanger Rating} = \text{\# of Heat Exchangers}$$

The above formula assumes that the user will install heat exchangers with the same rating. The formula must slightly vary if the user chooses to use heat exchangers with different ratings. Per our example, the user will require 5 heat exchangers rated at 1200 cfm. (6,000 cfm/1200 cfm/heat exchanger)=5 heat exchangers.

The user must then determine placement of the heat exchangers throughout the house. As indicated above, the user can install the heat exchangers at the side of the house or more centrally located within the house. The houses also vary in length and width. Most houses are approximately 400 feet long. The heat exchangers would be located throughout the length of the house. In one embodiment, additional heat exchangers are located towards the area of the house where the user first begins raising the chickens within the house. For example, if a user will place five heat exchangers in the house, the user may choose to evenly space the five heat exchangers throughout the house. However, greater savings can be realized by placing the heat exchangers towards the area in which the birds are first raised. Assuming a house having a length of 400 feet, three heat exchangers would be placed within the first 200 feet of the house and the other two heat exchangers would be placed in the second half of the house.

In one embodiment, the heat exchangers are placed within the house such that more heat exchangers will be located within one half of house in which the birds are first raised. In certain farming environments, the house may be divided in half by a curtain wall. A brooding chamber may be located in one half of the house. The birds are initially placed in the side of the house with the brooding chamber. To provide greater ventilation to the brooding chamber, more heat exchangers ventilate the half of the house with the brooding chamber than the other half of the house. By locating the heat exchangers within the half of the house in which the brooding chamber is located, the heat exchangers may assist ventilating the house when the birds are first introduced into the house.

To determine the placement of the heat exchangers in one embodiment, the number of heat exchangers must be determined as described above. The heat exchangers are placed throughout the house according to the number of heat exchangers and the length of the house. Each heat exchanger is spaced approximately an equal distance apart to provide fresh air evenly throughout the house. The spacing of each heat exchanger is determined according to the formula:

$$\text{Required Spacing} = \text{Length of House}/(\text{Number of Heat Exchangers} + 1)$$

If an even number of heat exchangers are required, the units may be spaced approximately the required spacing apart where the first unit is located the required spacing away from the side wall of the half of the house in which the brooding chamber is located. If an odd number of heat exchangers is required, the required spacing of the heat exchangers is determined by the formula found above. Instead of placing a heat exchanger within the middle of the house, the middle heat exchanger is located approximately 3 to 7 feet from the center of the house towards the half of the house with the brooding chamber. Such placement provides more heat exchangers in the half of the house in which the birds are first raised.

The remaining heat exchangers may then be placed in the second half of the house according to the required spacing. The heat exchangers may be placed the required spacing from the middle heat exchanger. The heat exchangers may also be placed starting from the required spacing from the side wall of the second half of the house.

Such placement of the heat exchangers minimizes the ductwork for the heat exchangers. In another embodiment, the intake air outlets of the heat exchangers may be placed according to the spacing description described above to provide more consistent ventilation throughout the house.

FIG. 10 shows another example that uses seven heat exchangers 166, 168, 170, 172, 174, 176, 178 in house 164 that is 500 feet long. In this embodiment, four heat exchangers 166, 168, 170, 172 are installed toward the area in which the birds are first raised within the house 164. The first four heat exchangers 166, 168, 170, 172 are placed 55 feet apart. The last three heat exchangers 174, 176, 178 are installed 70 feet apart.

In one embodiment, one to three units were used to provide tempered ventilation air for the first seven days of a flock. In one embodiment, more units supply the required tempered air in a full house.

In one embodiment, a house was retrofitted with four heat exchangers. Eighteen radiant brooders in each house provide supplemental heat. Approximately 20,000 day-old chicks were placed in half of the building initially (brood chamber) and kept for 7 days before being allowed to occupy the entire house. Broiler buildings are typically pre-heated to 33° C. (92° F.) on the day prior to chick placement, with temperatures dropping about 0.3° C. (0.5° F.) each day after chick placement. The houses may be equipped with solid-side walls, dropped ceilings, and tunnel ventilation systems.

The heat exchangers can be implemented in existing houses such that the houses are retrofitted with the heat exchangers. A study was conducted in two commercial broiler production buildings each measuring 12 m×121 m (40 ft×400 ft) located west of Fayetteville, Ark. Existing poultry houses have ventilation systems that include multiple fans spaced throughout the house. The ventilation system of one poultry house included four single-speed 91 cm (36 inch) diameter exhaust fans mounted on the north side walls and eight single-speed 125 cm (50 inch) diameter exhaust fans mounted on the west end of the side walls.

Ventilation inlet air can be introduced from a number of inlets uniformly distributed close to the eaves on both sidewalls or from gravity-activated attic inlets located at the center of the house to allow air flow through the attic space. Six stir fans (124 W or ⅙ HP each) installed 1 foot from the ceiling in each house were used to blow air horizontally to promote uniform temperature distribution during the minimum ventilation stage.

The configuration including the heat exchangers were installed in one test poultry house. No heat exchangers were installed in a control house of approximately the same size in approximately the same geographic area. The base line house utilizes 42 galvanized box inlets or 10 gravity-activated attic inlets to introduce the ventilation inlet air. Electricity use by the heat exchangers and ventilation fans were metered separately and recorded daily. Ammonia concentrations in each house were taken twice a week using colorimetric tube (0.5-78 ppm, Gastec Detector Tube) to ensure the air exchanges of the two houses were equivalent.

Description and Operation of Heat Recovery Ventilators

For the test, four 0.35 m×0.35 m×0.98 m (1.16 ft×1.16 ft×3.25 ft) air-to-air heat exchangers (American Aldes1, HRV 1200 Agricultural, 565 L/s [1200 cfm], 120 VAC, Bradenton, Fla.) were installed in the brood chamber of the test house (treatment). The core of the heat exchanger includes a series of cross-flow polyethelene flat plates. The heat exchangers were ceiling mounted on the center line of the house (FIG. 6) and approximately 45 feet apart. Care was taken to ensure these units do not interfere with the movement of brooders, feeders, waterers, and stir fan operation. The heat exchangers were powered on or off manually. Each heat exchanger has two intake and two exhaust blowers, each rated a 187 kW (¼ HP) and could operate with three speeds. In one embodiment, the heat exchangers were wired to only run on high speed. The intake air was drawn from the attic space through 10 inch round ducts into the heat exchangers to be pre-heated before being released directly into the building, as shown in FIG. 6. The building air first passed through a polyester filter approximately 5 cm thick (2 inches) before entering each heat exchanger. The air was then exhausted through 10 inch round ducts vertically through a chimney on the roof. The filter was changed every 2 days.

Condensate as a result of heat loss from the warm air stream of each unit was drained from each heat exchanger. In one embodiment, the drains direct the condensate to a French drain outside of the house. In other embodiments, the condensate may be drained to other locations.

The heat exchangers were tested in the test house for two 6.5 week growth cycles between January and May of 2011 in the test house. Heat exchangers provided all the ventilation air needed for the test house during the first 7 days when the birds remained in the brood half of the treatment house, while wall exhaust fans were off and all attic and sidewall inlets were closed. After birds were turned out to the entire house, a combination of the heat exchangers and the known ventilation systems were used in the house. Ventilation of the non-brood section of the test house was provided by two 91-cm diameter minimum ventilation fans and five attic inlets (gravity-activated) in the non-brood section. The five attic inlets in the brood section remained closed. The number of the heat exchangers operating and the runtime of the minimum ventilation fans in the treatment house were adjusted every day to match the total ventilation rate with that of the control house. The ventilation rates between the two halves of the test house were balanced as close as possible. The control house relied on two or three 91-cm sidewall exhaust fans and 10 attic inlets for ventilation. The heat recovery ventilators operated for 35 and 18 days during the winter and mild flocks, respectively.

Data Acquisition and Analysis

The number of heat exchangers operating within the test house was recorded every day as well as the runtime for minimum ventilation fans in each house. Daily ventilation rates during the first four weeks in both houses were calculated using the measured static pressure difference and the calibrated fan curves previously determined using FANS units. The amount of condensate was recorded from each heat exchanger whenever it filled the 5 gallon container before being emptied outside. Fuel use, electricity consumption of the heat exchangers and building exhaust fans of the two houses were recorded daily. Bird performance data including individual bird weight, total house weight, livability, and feed conversion were collected for each house of the two flocks.

The amount of heat transferred through each heat exchanger from the warm stream should be equal to heat received by the cold stream. The heat balance across the cold stream only involved sensible heat; whereas the energy balance on the warm stream produced large amounts of condensate and both the sensible and the latent heat contributed to the heat exchanged.

From the recorded number of units operating at any given time, the total energy saved was estimated from the energy savings from #2 and #3 heat exchangers to include #1 heat exchanger and #4 heat exchanger if applicable. The equivalent gallons of propane were calculated by dividing the heat recovered by the gross heating value of propane (92,000 Btu/gal) by assuming complete combustion of heaters. A current price a $1.70 per gallon for propane was used to determine the dollar amount saved per day.

Results

Figure 11:
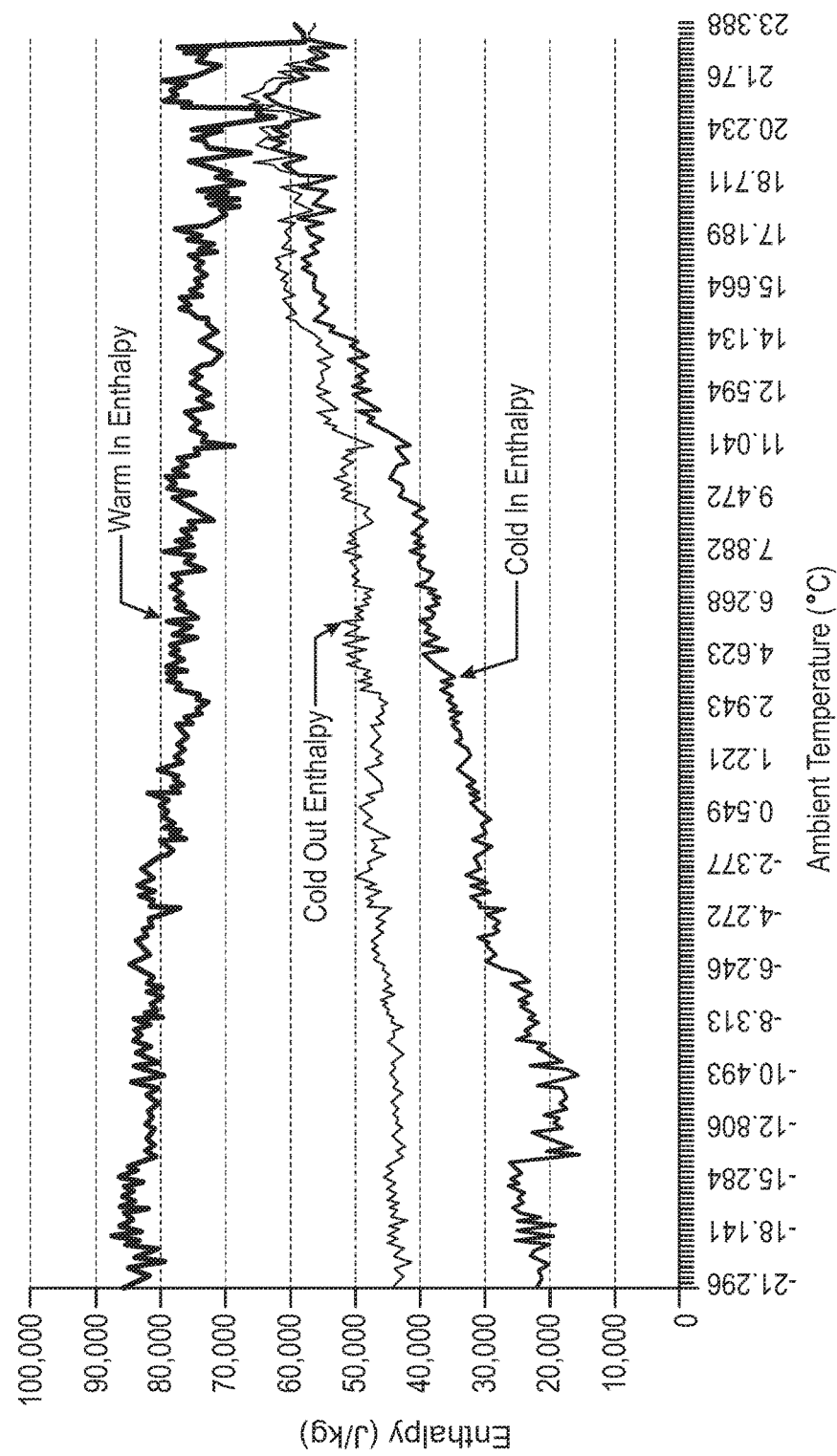
FIG. 11 is a graph showing results of the present invention.
Figure 12:
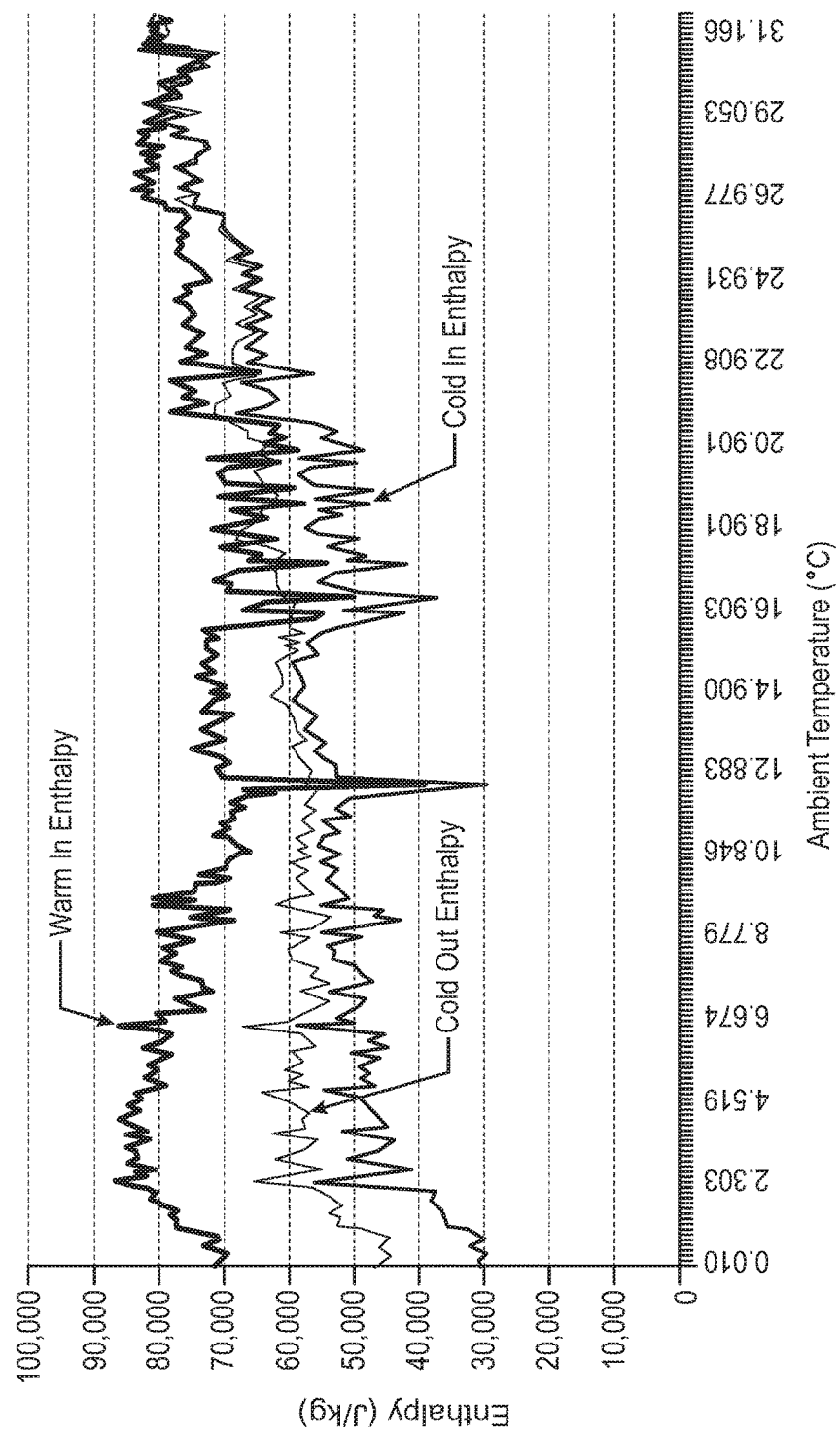
FIG. 12 is a graph showing results of the present invention.
Figure 13:
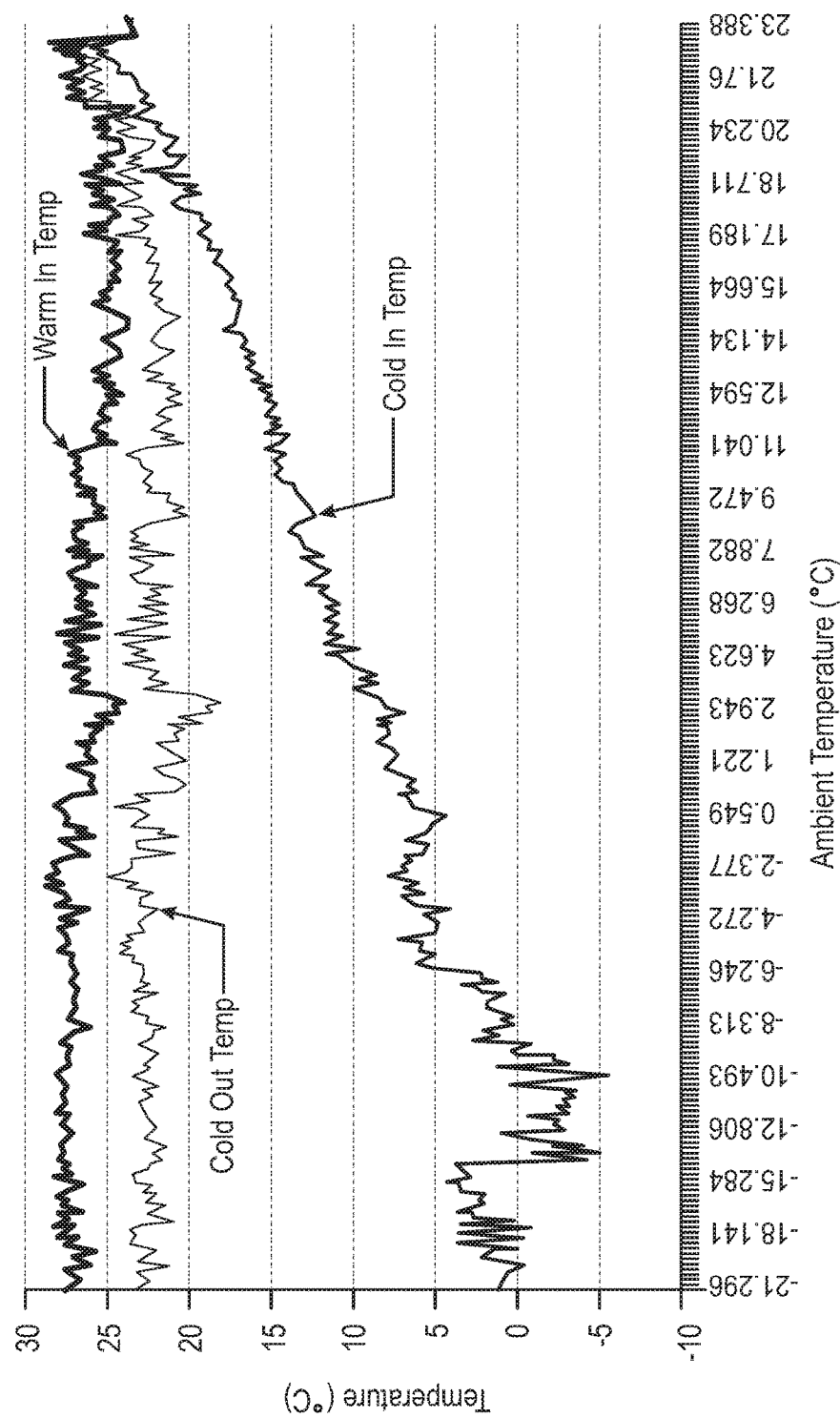
FIG. 13 is a graph showing results of the present invention.
Figure 14:
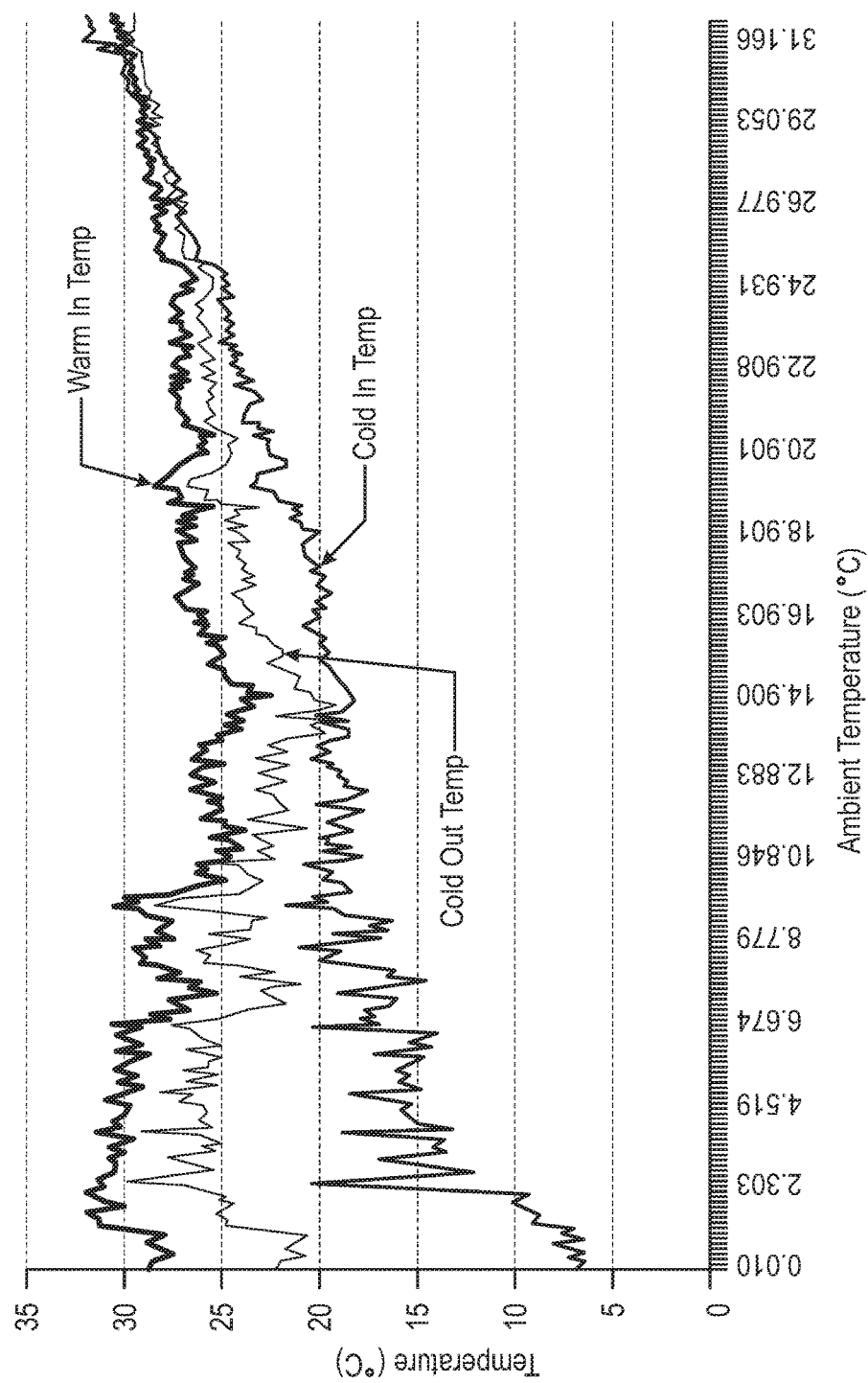
FIG. 14 is a graph showing results of the present invention.
Figure 15:
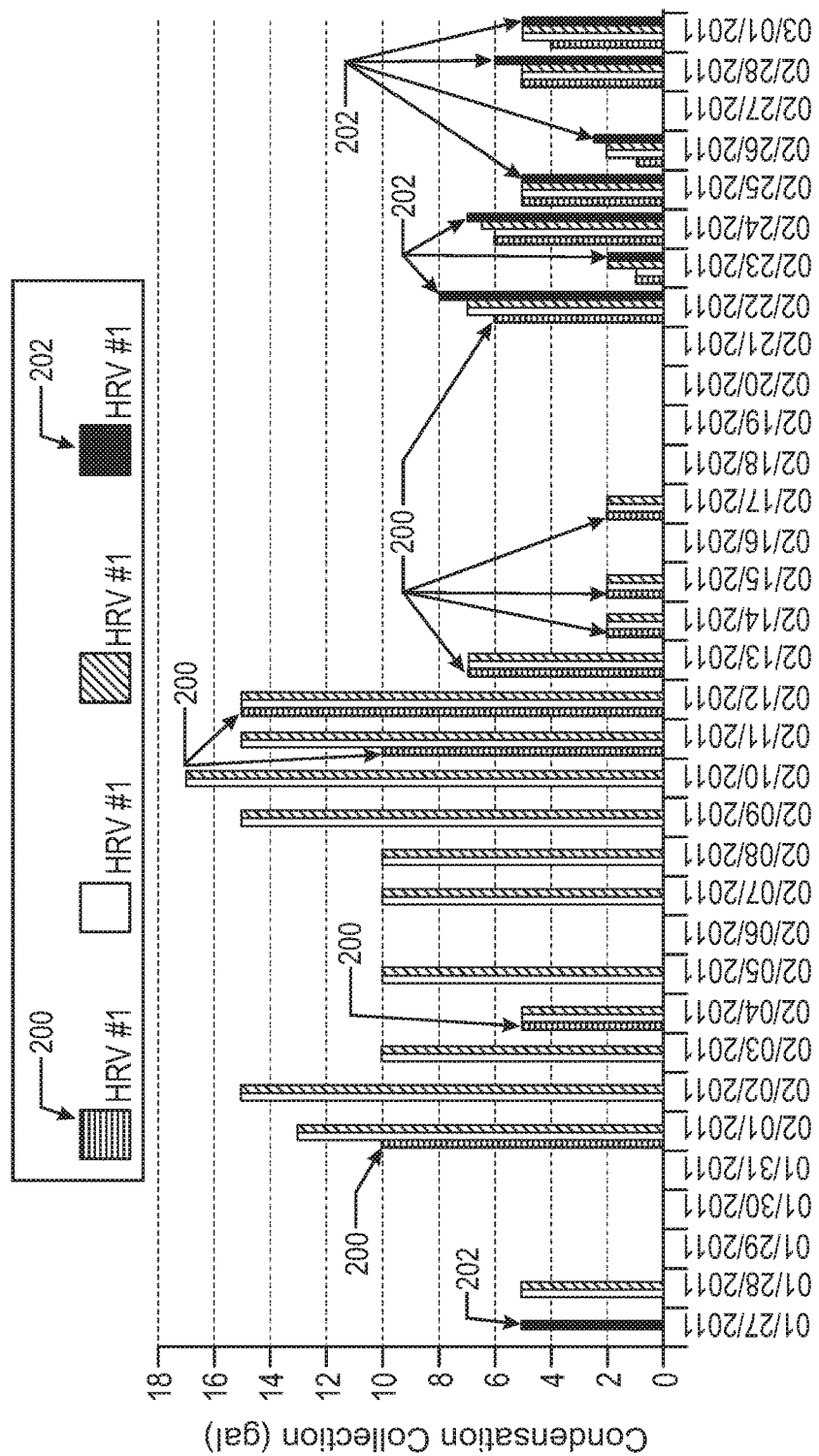
FIG. 15 is a graph showing results of the present invention.

The heat transferred was summed to provide daily and total heat transferred for the two test periods (FIGS. 11 (Flock 1) and 12 (Flock 2)). Heat transfer calculated for the two measured heat exchangers were similar. A large ΔT (up to 25° C.) on the cold air stream was observed (FIGS. 13 (Flock 1) and 14 (Flock 2)), especially when the ambient temperatures were below zero. The cold air exit temperature did not drop below 5° C. less than the room temperature of the house throughout the test. Large amounts of condensation were collected on the days when ambient temperatures were low (FIG. 15). As much as 64 L (17 gallons) of condensate was removed from the warm air stream per heat exchanger per day. Each gallon of condensate represents approximately 9,200 kJ transferred to the cold stream. This large amount of latent heat in the warm air stream partially contributed to the large temperature increase on the cold air stream.

Figure 16:
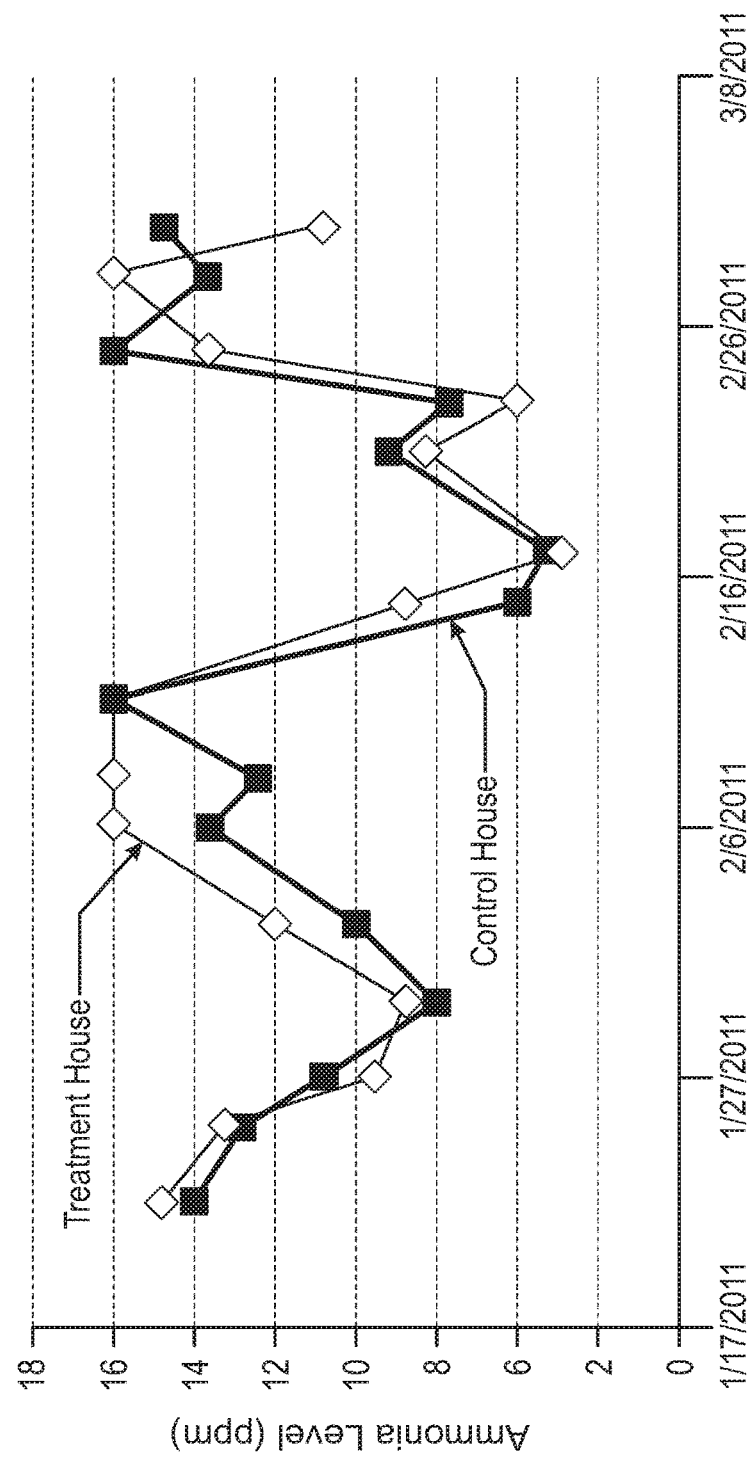
FIG. 16 is a graph showing results of the present invention.

Daily ventilation rates as a result of the heat exchanger in the brood section and normal exhaust fans in the off-brood section of treatment house were calculated as well as those of the control house. The houses were primarily under minimum ventilation for the first 4 weeks during Flock #1, when up to 4 heat exchangers operated continuously. Weekly average ventilation were rates were shown in Table 1. Ventilation rates of the test house were almost identical to those of the control house during the first week, but were higher (up to 4%) in week 2 and 3. Ventilation rates in the test house were calculated separately due to there being more than one ventilation source (heat exchangers and wall fans). However, since air is not containable in an undivided space the calculated values may not represent the actual air change rates from both sides of the house. Ammonia concentrations measured by colorimetric tubes during Flock 1 were similar for both houses (FIG. 16).

TABLE 1

Ventilation rates (L/s/1000 hd [cfm/1000 hd]) during the first four weeks when building was primarily under minimum ventilation during Flock 1

| | Treatment House | | | Control House |
|---|---|---|---|---|
| | Brood Section | Non-brood Section | Whole house | |
| Week 1 | 64 (136) | 0 (0) | 64 (136) | 65 (138) |
| Week 2 | 75 (159) | 86 (181) | 161 (340) | 154 (326) |
| Week 3 | 66 (140) | 78 (166) | 144 (305) | 139 (294) |
| Week 4 | 88 (186) | 124 (264) | 212 (449) | 215 (454) |

Figure 17:
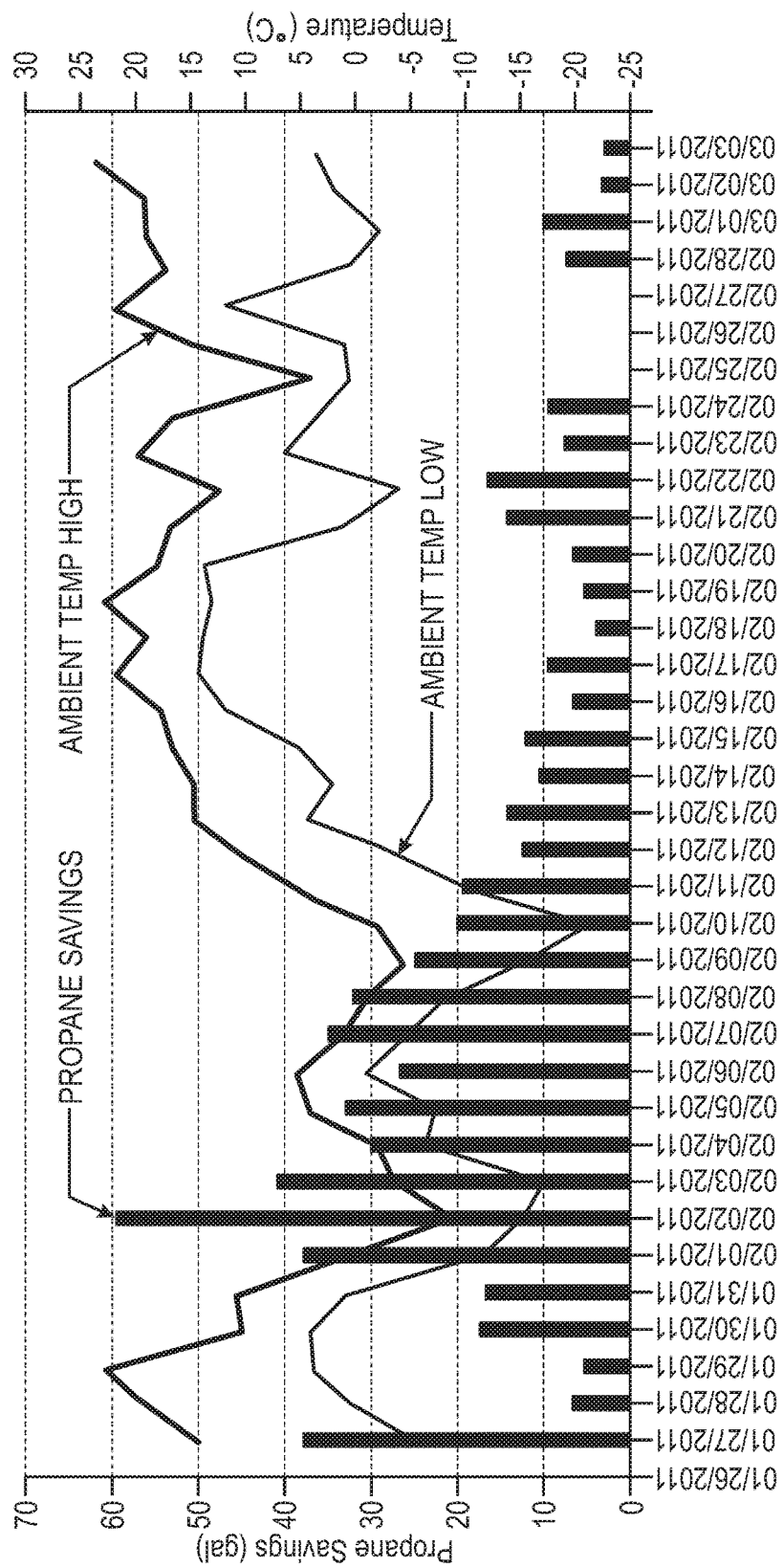
FIG. 17 is a graph showing results of the present invention.
Figure 18:
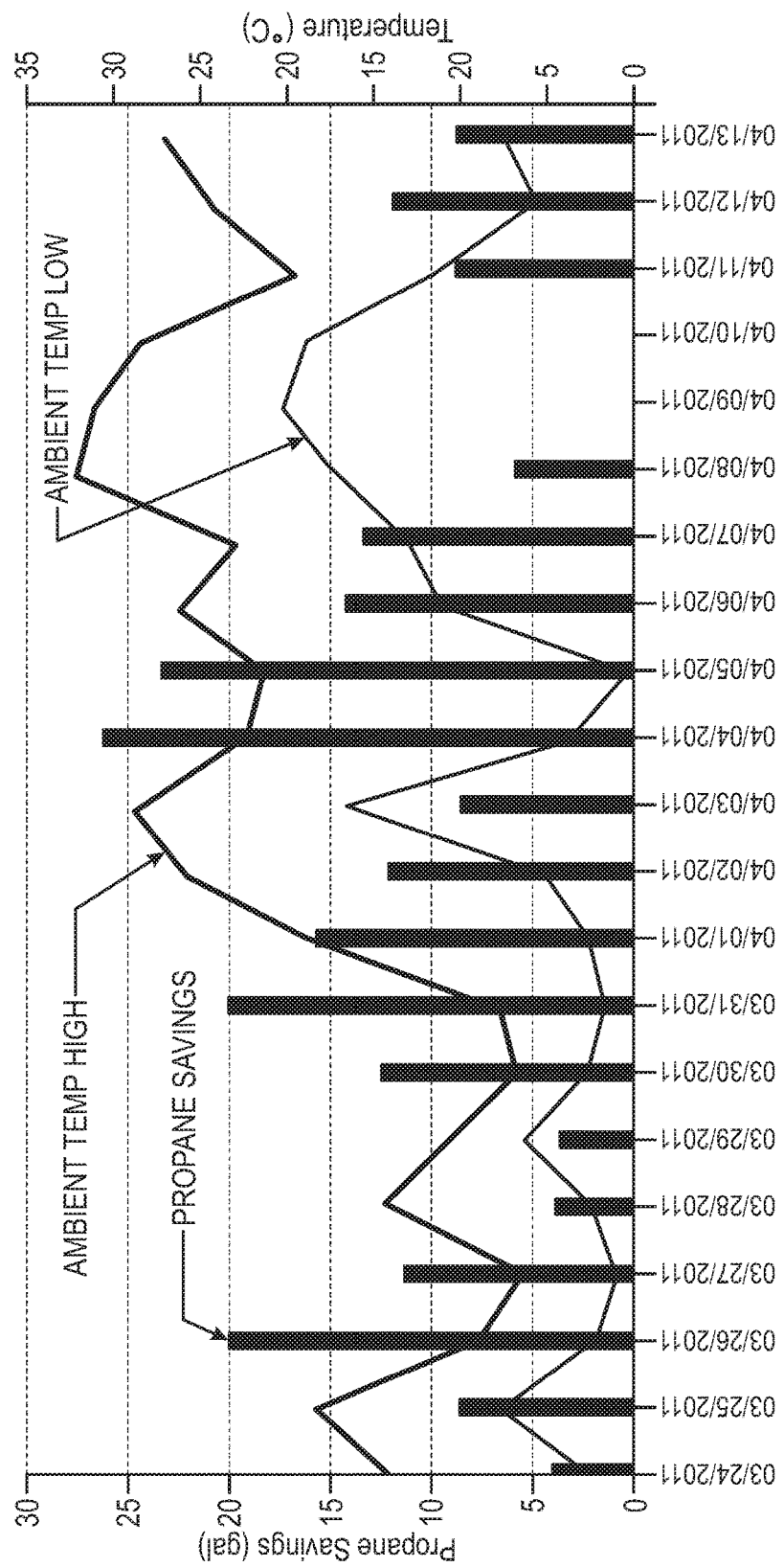
FIG. 18 is a graph showing results of the present invention.

The results showed a substantial savings even though the heat exchangers only provided tempered air to half of the house. Five hundred and ninety-seven (597) gallons of propane were saved during the winter flock and two hundred and thirty-four (234) gallons of propane were saved during the spring flock with a propane savings of $1010 and $400, respectively. The greatest saving occurred in the first few weeks and decreased as house temperature was steadily lowered, the birds grew in size and the ambient temperature rose. The sensible and latent heat of the birds became a large source of heat to the space. The larger birds required cooling on warmer days and the heat exchangers were turned off for three days in week 4 and the weeks after (FIGS. 17 (Flock #1) and 18 (Flock #2)).

Figure 19:
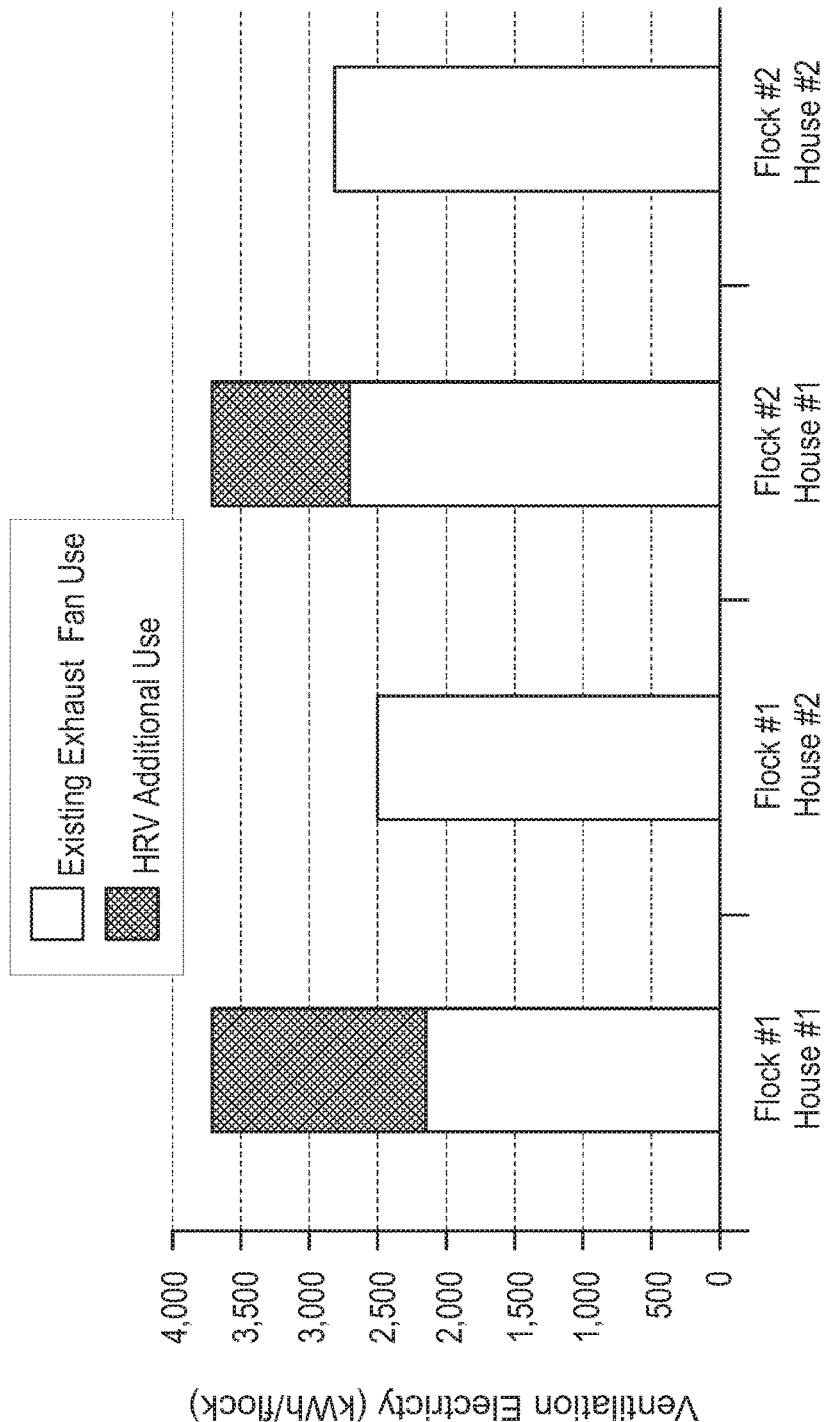
FIG. 19 is a graph showing results of the present invention.

Referring to FIG. 19, the operation of the heat exchangers alone used 1,567 and 842 kWh electricity during Flocks #1 and #2, respectively, comparing to 2,497 and 2,818 kWh used by existing ventilation fans in the control house. Normal exhaust fans in the treatment house used less electricity compared the control house due to the ventilation provided by heat exchangers. A limitation with comparing between the control house and the treatment house was the lack of computer controls that would ensure that the Ventilation rates were equal. It is recognized that the ventilation rates in the two houses were different. With an estimated $0.08/kWh, running heat exchangers incurred an additional cost of $100 and $60 for the winter and spring flock, respectively. The net cost saving was estimated to be $910 and $348 for the two test flocks. Based upon current cost and preliminary results, the ROI would be between 4 and 5 years, assuming each house would grow two winter and two mild season flocks.

After the first flock, the plastic cores were removed from #2 heat exchanger and inspected. There was dust in the condensation pan but the core was clean. A water hose was used to clean the remaining units. The filters had allowed fine particles to pass through, but it appears that the velocity through the plates was high enough that the fines were not trapped on the cold air stream, and possibly the condensate washed the warm air side.

The mortality rate and the weight of the birds were compared to the control house. The heat recovery ventilators showed no detrimental effect on the performance of the birds.

CONCLUSIONS AND RECOMMENDATIONS

The preliminary test demonstrates the viability of using multiple heat recovery ventilators to provide the required minimum ventilation for a poultry house. The calculated heat recovery was equivalent to 593 and 253 gallon of propane for the winter flock and mild season flock, respectively.

Additional heat exchangers could be added to provide ventilation during the heating period for the entire house. The units were designed to provide three levels of air flow. Therefore, with an automatic controller integrated into the existing house environmental controller, the ventilation control capability could be greatly enhanced with the required ventilation rates accurately determined.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A ventilation system for installation in a poultry house with house air, the ventilation system comprising:
   an outside intake air inlet wherein the outside intake air inlet draws in intake air from outside the poultry system;
   a screen connected to the outside intake air inlet, the screen positioned to screen the intake air;
   a house air inlet wherein the house air inlet draws in house air;
   a heat exchanger connected to the single outside intake air inlet and the house air inlet, the heat exchanger transferring heat from the house air to the intake air;
   a house air outlet, wherein the house air outlet prevents rain, animals, other living animals, and other environmental factors from entering the house air outlet, wherein the house air outlet releases the house air outside the house;
   an intake air outlet connected to the heat exchanger, the intake air outlet releasing the intake air into the house;
   an intake air outlet connected to the heat exchanger, the intake air outlet releasing the intake air into the house, wherein the intake air outlet directs the intake air away from the house air inlet;
   a filter assembly adjacent the house air inlet, the filter assembly configured to receive a filter sized to filter out dust, debris, and other particulates;
   the filter placed adjacent the filter assembly, the filter configured to filter the house air before the house air reaches the heat exchanger; and
   a hanging inlet support that attaches to the house air inlet, the hanging inlet support suspending the house air inlet.

2. The system of claim 1 wherein the outside intake air inlet is located outside of the house, the outside intake air inlet drawing air from outside of the house.

3. The system of claim 1 wherein the house air outlet directs the house air away from the outside intake air inlet.

4. The system of claim 1 further comprising:
   a cap located above the house air outlet, the house air outlet aimed upward, the cap configured to restrict access to the house air outlet.

* * * * *